(12) United States Patent
Guillotel et al.

(10) Patent No.: US 8,428,132 B2
(45) Date of Patent: Apr. 23, 2013

(54) FRAME OR FIELD MODE CODING METHOD

(75) Inventors: Philippe Guillotel, Vern sur Seiche (FR); Dominique Thoreau, Cesson Sevigne (FR); Julien Haddad, Rennes (FR)

(73) Assignee: Thomson Licensing, Issy-les-Moulineaux (FR)

( * ) Notice: Subject to any disclaimer, the term of this patent is extended or adjusted under 35 U.S.C. 154(b) by 1061 days.

(21) Appl. No.: 12/308,907

(22) PCT Filed: Jun. 26, 2007

(86) PCT No.: PCT/EP2007/056366
§ 371 (c)(1),
(2), (4) Date: Dec. 29, 2008

(87) PCT Pub. No.: WO2008/000737
PCT Pub. Date: Jan. 3, 2008

(65) Prior Publication Data
US 2009/0304079 A1   Dec. 10, 2009

(30) Foreign Application Priority Data
Jun. 30, 2006  (FR) ...................... 06 05969

(51) Int. Cl.
*H04N 7/12* (2006.01)
(52) U.S. Cl.
USPC .................................. 375/240.13; 375/240.24
(58) Field of Classification Search ............... 375/240.1, 375/240.12, 240.15, 240.13, 240.24
See application file for complete search history.

(56) References Cited

U.S. PATENT DOCUMENTS

| | | | | |
|---|---|---|---|---|
| 5,047,852 A | * | 9/1991 | Hanyu et al. ................ | 375/240.2 |
| 5,784,107 A | | 7/1998 | Takahashi | |
| 6,259,733 B1 | * | 7/2001 | Kaye et al. .................... | 375/240 |
| 7,742,529 B1 | * | 6/2010 | Ghanbari ................. | 375/240.27 |
| 2007/0030906 A1 | * | 2/2007 | Cote et al. ................ | 375/240.16 |
| 2007/0121001 A1 | * | 5/2007 | Wang et al. .................... | 348/452 |

FOREIGN PATENT DOCUMENTS

| | | |
|---|---|---|
| EP | 1494483 | 1/2005 |
| JP | 04108285 | 4/1992 |
| WO | WO 2006/033915 | 3/2006 |

OTHER PUBLICATIONS

Yanmei Qu et al: "A fast MBAFF mode prediction strategy for H.264/AVC", Signal Processing 2004, Proceedings. ICSP '04. 2004 7$^{th}$ Intl Conference on Beijing, China Aug. 31-Sep. 4, 2004, pp. 1195-1198, xp010810613.

M. A. Guerrero et al: "Fast Macroblock-Adaptive Frame/Field Coding Selection in H.264", Internet Citation, Mar. 8, 2005, XP002396280.

Search Report Dated Aug. 15, 2007.

* cited by examiner

*Primary Examiner* — Farid Homayounmehr
*Assistant Examiner* — Suman Debnath
(74) *Attorney, Agent, or Firm* — Myers Wolin, LLC

(57) ABSTRACT

The method comprises the following steps:
  calculation of the spatial activity of each macroblock and of the temporal activity between the macroblocks constituting a group of macroblocks in field mode,
  calculation of an activity index relating to the group that is an increasing function of the temporal activity and a decreasing function of the spatial activity of the group,
  comparison of the activity index relating to the group, to a predefined threshold, to define it as a group having activity,
  coding of the picture in field or frame mode according to the number of macroblock groups detected having activity with respect to the number of groups of macroblocks in the picture.

The application relate to data compression, particularly the H 264 standard.

5 Claims, 2 Drawing Sheets

FRAME OR FIELD MODE CODING METHOD

This application claims the benefit, under 35 U.S.C. §365 of International Application PCT/EP2007/056366, filed on Jun. 26, 2007, which was published in accordance with PCT Article 21(2) on Jan. 3, 2008 in French and which claims the benefit of French patent application No. 0605969, filed on Jun. 30, 2006.

The invention relates to a method and a device for coding a picture in field or frame mode, the frame mode being able to use the field mode locally in the picture, for a group of macroblocks.

Interlaced video is the most commonly used format for television. A frame picture is comprised of two even and odd fields also called top field and bottom field, that represent respectively the even and odd lines of the picture. The top field and the bottom field being acquired at two different times, some pictures of a sequence present interlacing artefacts due to movement between the two acquisitions.

To improve support of this format, the MPEG 4 or H264 standard enables a picture to be coded according to three different modes: "frame", "field" and "MBAFF" (Macro Block Adaptive Field Frame). In frame mode, the picture is coded as it is, in field mode, the two fields are coded separately. The MBAFF mode can be used in addition to the frame mode to improve this mode by enabling the fields of the picture to be separated locally.

Figure 1:
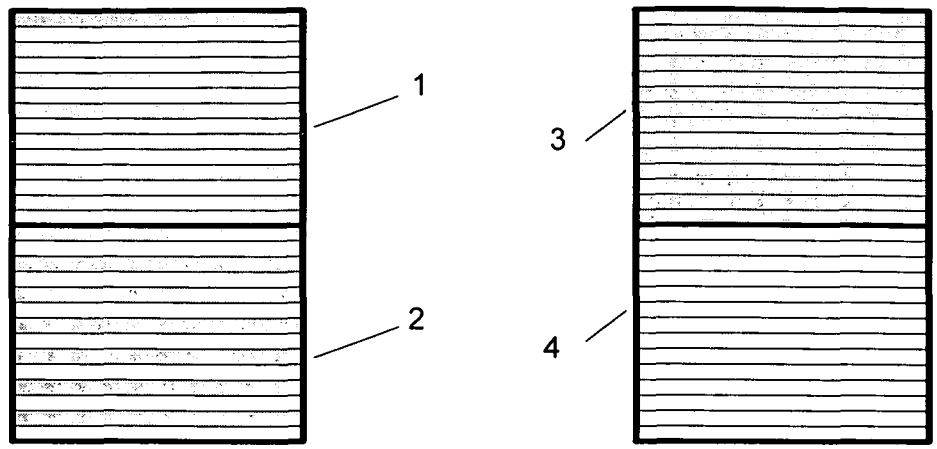
Figure 2:
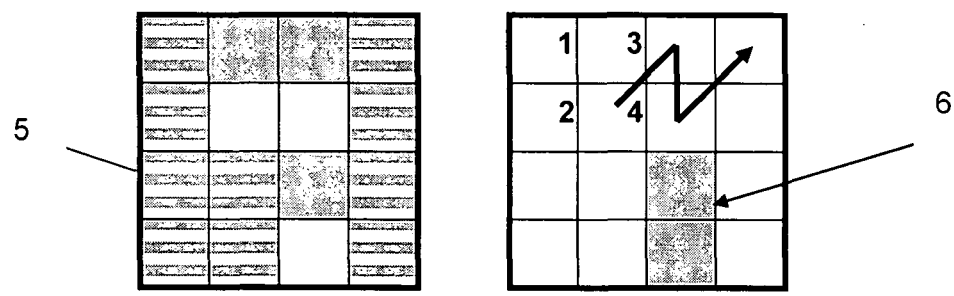

FIG. 1 shows a group of macroblocks of a picture or Super-MacroBlock (SMB) constituted by two vertical macroblocks (MB), coded in field mode or frame mode. The coding of the supermacroblock in frame mode consists in coding macroblocks referenced 1 and 2 each constituted by an alternation of lines of a first and second field. The coding of the supermacroblock in frame mode consists in coding macroblocks referenced 3 and 4 each constituted by a succession of lines belonging respectively to the first and the second field. FIG. 2 shows a picture referenced 5 for which a picture scan is carried out in pairs of macroblocks or supermacroblocks referenced 6 enabling the choice of coding locally.

Therefore, the problem of mode selection is posed, field or frame coding mode for the picture and, for the field coding mode of the picture, field or frame coding mode of the supermacroblocks of the picture, that enable optimisation of the compression from the point of view of the bitrate/quality of the picture.

Two solution types currently exist to resolve this problem, those based on an a posteriori criterion and those based on an a priori criterion.

In the case of an a posteriori algorithm, the coding is carried out in two passes, one in field mode and the other in frame or frame+MBAFF mode. The coder then memorizes the results obtained after each of the passes then compares them using an optimization function based on a picture bitrate/quality compromise. The disadvantage of this type of method is its cost in calculation time.

Several a priori approaches exist:

A first "a priori" approach is described in the document entitled "Fast decision on picture adaptive frame/field coding for H.264" authors. Yin, A. Tourapis, J. Boyce. The algorithm described proposes to resolve the problem in the case where the coder has the choice between the field and frame modes only. It is based on the hypothesis that the zones of a picture that are in motion are frequently better coded in field mode than in frame mode.

The main idea is to detect the supermacroblocks, constituted by 2 vertical macroblocks, that belong to a region in motion, using the motion detection filter presented in the document entitled "A Robust Motion Detection and Estimation Filter For Video Signals", authors M. Latzel, J. K. Tsotsos, Proceedings of the 2003 SPIE Conf. on Image and Video Communication and Processing, January 2003.

If the picture is generally composed of macroblocks "in motion" the algorithm takes the decision to code it in field mode, and in the other case in frame mode.

The motion detector filter used is given by its coefficients $K_{BP}=[-1,2,-3,4,-3,2,-1]$. This filter is applied vertically to the picture $I(x,y)$, that is to the luminance values of the picture, to, at the output, give the picture $I_{BP}(x, y)$. A mask picture is then constructed in the following manner:

$$M(x, y) = \begin{cases} 1 & \text{if } |I_{BP}(x, y)| > T_1 \\ 0 & \text{else} \end{cases}$$

with T1, a predefined threshold.

A supermacroblock is considered to be in motion if the x,y pixels of said supermacroblock SMB are such that:

$$\sum_{x,y \in SMB} M(x, y) > T_2$$

with T2, a predefined threshold.

The S ratio of the supermacroblocks in motion with respect to the supermacroblocks in the picture is then calculated as well as the mean of the absolute value of the difference D in luminance between the current picture and its reference.

The frame/field decision is taken for the entire picture, as follows:

if the picture is of the intra type and if S<0.5, coding is in frame mode else, coding is in field mode, else, if the picture is of the bidirectional predictive type and if S<0.6, coding is in frame mode else, coding is in field mode else, if the picture is of the unidirectional predictive type and if ((S>0.5) OR ((S>0.3 AND D>4.5) AND (D<10.0))), coding is in frame mode, else, coding is in frame mode The terms in capitals AND and OR are logical operators.

Also proposed in the document is an automatic determination of the various thresholds.

The disadvantage of this method is that it is not optimized as it does not take account of the possible local use of the field or frame mode. It is not suited to the MBAFF mode.

Another approach is proposed in the European patent application published under the number EP 1494483 and entitled "Video coder with control of GOP structure by spatial and temporal activity" submitted on 5 Jan. 2005, inventors X. Ducloux, P Alexandre and L Noblet, in which they describe an algorithm being based this time on a global criterion. The comparison of two metrics computed on the whole picture enables the frame/field selection.

The two metrics are the following:

The intra-field luminance gradient is the sum of the absolute values of differences between two consecutive lines and is calculated 16 lines by 16 lines in the field:

$$FLADIntra_n[k] = \sum_{j=8k}^{j=8k+7} \sum_{i=0}^{i=nbpels-1} |FYn(i, 2j) - FYn(i, 2j+1)|$$

where $FY_n(i, j)$ represents the luminance value of the pixel of horizontal coordinate i and vertical coordinate j of the k row of 16×16 blocks in the field n, the index k varying from k=0 to k=(number of lines of the field)/16−1.

The inter-field luminance gradients are given by the sum of the absolute values of differences between colocated pixels of two fields separated by periods of 1T, 2T, xT and are calculated 16 lines by 16 lines in the field:

$$FLADInter1T_n[k] = \sum_{j=16k}^{j=16k+15} \sum_{i=0}^{i=nbpels-1} |FYn(i, j) - FYn-1(i, j)|$$

$$FLADInter2T_n[k] = \sum_{j=16k}^{j=16k+15} \sum_{i=0}^{i=nbpels-1} |FYn(i, j) - FYn-2(i, j)|$$

$$FLADInterxT_n[k] = \sum_{j=16k}^{j=16k+15} \sum_{i=0}^{i=nbpels-1} |FYn(i, j) - FYn-x(i, j)|$$

The denominations FLADIntra and FLADInter are deemed to be similar to FieLd Absolute Difference.

The global gradients intra-field $FLADIntraSum_n$ and inter-field $FLADInter1T_n$ are given, for the n field, by:

$$FLADIntraSum_n = \sum_{k=0}^{k=nblines/16-1} FLADIntra_n[k]$$

$$FLADInter1TSum_n = \sum_{k=0}^{k=nblines/16-1} FLADInter1T_n[k]$$

Supposing that the field n-1 is the top field of the picture and n the bottom field, the selection criterion is given by the spatial activity:

$$SPAct = \frac{1 + \min(FLADInter1TSum_{n-1}, FLADInter1TSum_n)}{2 + 0.5 * \max(picture\_size, (FLADIntraSum_{n-1} + FLADIntraSum_n))}$$

If SPAct is greater at a predefined threshold, the picture is coded in field mode, if not the picture is coded using the frame mode +MBAFF.

Finally, a third approach consists in coding all the B pictures, of bi-directional predictive type, in frame mode and the pictures P of unidirectional predictive type in field mode. This simple algorithm comes from the recognition that they are the modes most used by the a posteriori algorithm for each picture type.

Relating to this prior art, the motion detector filter requires processing operations on the complete picture, calculations and memorising of masks. The filtering solutions are not optimized, in particular for the choice of the coding mode at the macroblock or supermacroblock level.

Likewise, the calculation of global gradients does not allow the compression to be optimized, the choice of the coding mode being carried out for the complete picture.

The last solution, though simple to implement, is not optimized in terms of rate of compression at a given quality of recovery.

One of the purposes of the invention is to overcome the aforementioned disadvantages. The purpose of the invention is a method and a device for coding a picture in field or frame mode, the picture frame mode being able to use the field mode locally in the picture, for a group of macroblocks, characterized in that it comprises the following steps:

calculation, for a group of macroblocks in field mode, of the spatial activities of each constituent macroblock and the temporal activity between the macroblocks of each constituent field, calculation of an activity index relating to the group that is an increasing function of the temporal activity and a decreasing function of the calculated spatial activities, comparison of the activity index relating to the group, to a predefined threshold, to define it as a group having activity, coding of the picture in field or frame mode according to the number of macroblock groups detected having activity with respect to the number of groups of macroblocks in the picture.

According to a particular implementation, the temporal activity is a function of the inter-field gradient between the field macroblocks of the group of macroblocks in field mode and the spatial activity is a function of the intra-field gradient between the lines taken two by two from each of the field macroblocks in field mode.

According to a particular implementation, the activity index is an increasing function of the inter-field gradient and a decreasing function of the sum of intra-field gradients.

According to a particular implementation, said group of macroblocks is a supermacroblock and the field or frame mode at the level of the group of macroblocks is the MBAFF (MacroBlock Adaptive Field Frame) mode.

According to a particular implementation, the relative activity has a value of:

$$R = \frac{FLADInterMB}{1 + FLADIntraMB_n + FLADIntraMB_{n-1}}$$

-continued with $$FLADInterMB = \sum_{j=0}^{15} \sum_{i=0}^{15} |FY_n(i, j) - FY_{n-1}(i, j)|,$$

$$FLADIntraMB_n = \sum_{j=0}^{7} \sum_{i=0}^{15} |FY_n(i, 2j) - FY_n(i, 2j+1)|,$$

$FY_n(i, j)$ representing the luminance value of the pixel of horizontal coordinate i and vertical coordinate j of the field n of the supermacroblock.

According to a particular implementation, if the ratio of the number of groups of macroblocks declared with activity to the total number of groups of macroblocks is greater than a predetermined threshold, the picture is coded in field mode, the picture being coded in MBAFF frame mode otherwise.

According to a particular implementation, the predetermined threshold is ½.

The invention also relates to a device for implementing the method, comprising a pre-analysis circuit to perform a coding decision algorithm, linked to a coding circuit for the actual coding of a picture in field or frame mode, characterized in that the coding circuit receives from the pre-analysis circuit coding information in field or frame mode according to the number of groups of macroblocks detected having activity, in the picture.

The invention, in adapting the detection of motion or activity to the coding entities and to possible coding modes, that is to the group of macroblocks and to the field and frame mode, and in improving this detection, enables optimization of the field or frame coding mode choice for the picture. The data compression, or the picture quality for a given bitrate, is improved.

Figure 3:
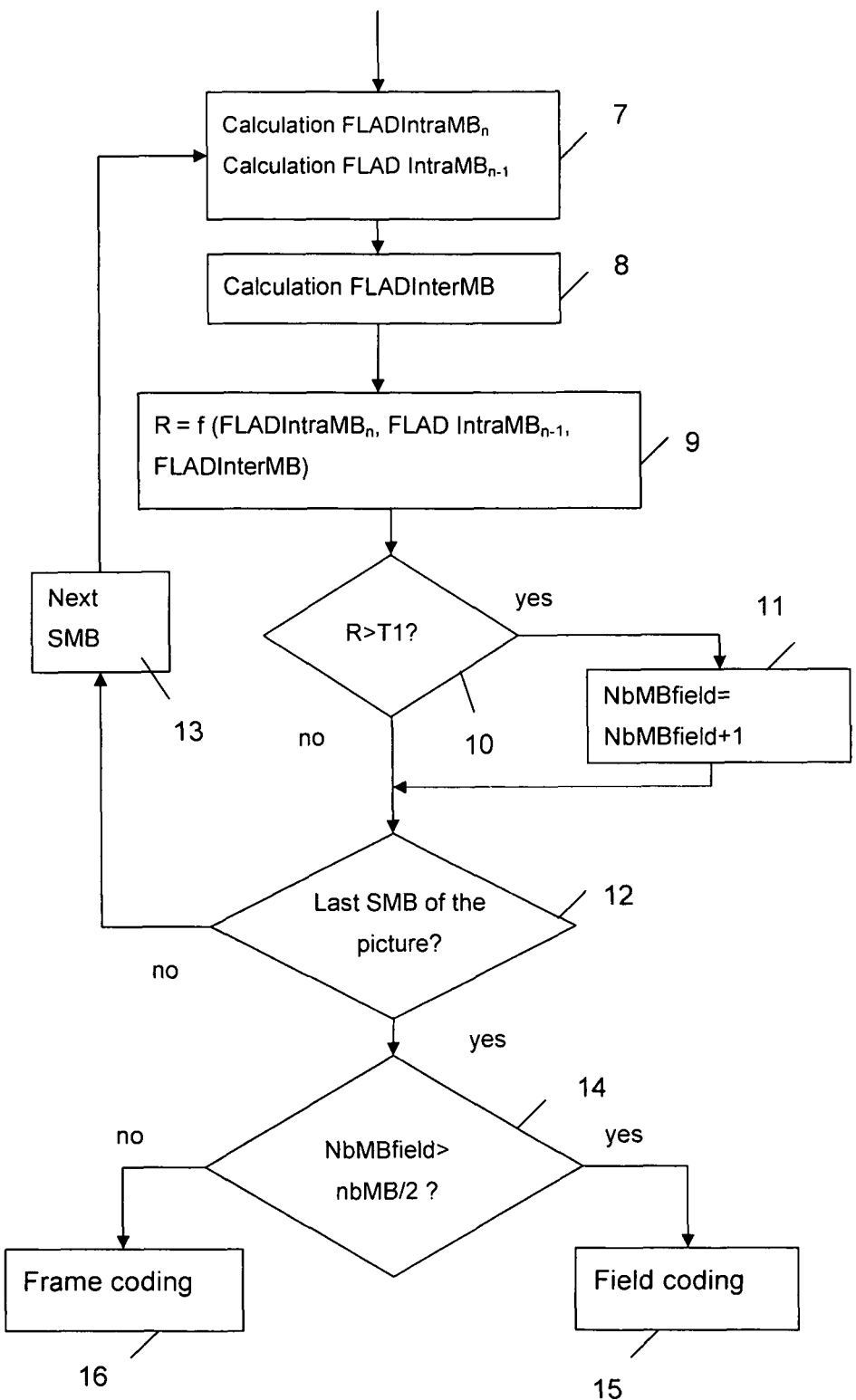

Other specific features and advantages will emerge clearly from the following description, the description provided as a non-restrictive example and referring to the annexed figures wherein:

FIG. 1, a group of macroblocks in frame and field mode,

FIG. 2, a picture coding using the MBAFF mode,

FIG. 3, a coding algorithm according to the invention.

The principle consists in using the metric gradient in a local approach. It involves detecting the supermacroblocks of the picture meeting a particular criterion relative to the gradients. A pre-analysis phase enables their ratio to be calculated in order to decide on the frame/field coding mode at the level of the picture.

In the rest of the description, the spatial activity or spatial complexity of a block will be referred to as a value that is directly linked to the spatial correlation within the block. When the spatial complexity is high, the correlation is low and vice versa. Likewise, the temporal complexity is linked to the temporal correlation, in general between two colocated blocks of pictures or successive fields of a sequence of pictures.

The fact of using the vertical spatial activity in the field for the selection of the coding mode of the supermacroblocks enables one to relativize the motion information corresponding to the inter-field difference. The advantage of MBAFF coding is in fact less if it involves zones of homogenous motion or stable textured zones. In this situation, namely the encoding of the picture into separated fields or into frames with the possibility of MBAFF, the essential is to take the judicious field or frame decision and to be able to use the MBAFF coding where necessary. Hence, if the preceding formula is considered:

$$SPAct = \frac{1 + \min(FLADInter1TSum_{n-1}, FLADInter1TSum_n)}{2 + 0.5 * \max(picture\_size, (FLADIntraSum_{n-1} + FLADIntraSum_n))}$$

it can be seen that the value SPAct is the result of a global calculation on the whole picture, the field/frame decision being taken in relation to a threshold. In reality, this global calculation, through the averaging, has a tendency to dilute the local measurements relating to the macroblock pairs. As is evoked later in the document, the invention firstly proposes to take a field/frame decision locally, and subsequently, to make a global analysis, this analysis operating from a set of local decisions. The simulation results, presented in the document, show the relevance of this approach.

FIG. 3 shows a flow chart of the method according to the invention.

The data relating to a field n-1 and a field 1 is sent to the input of the flow chart. Each supermacroblock, constituted by a macroblock of the field n-1 and a macroblock of the field n is processed successively.

Step 7 carries out the intra calculation of $FLADIntraMB_n$ corresponding to the difference in the absolute value of the lines, taken two by two, within the 16×16 macroblock of the field n.

$$FLADIntraMB_n = \sum_{j=0}^{7}\sum_{i=0}^{15} |FY_n(i, 2j) - FY_n(i, 2j+1)|$$

Likewise for the calculation of $FLADIntraMB_{n-1}$ corresponding to the 16×16 macroblock of field n-1:

$$FLADIntraMB_{n-1} = \sum_{j=0}^{7}\sum_{i=0}^{15} |FY_{n-1}(i, 2j) - FY_{n-1}(i, 2j+1)|$$

$FY_n(i, j)$ represents the luminance value of the pixel of horizontal coordinate I and vertical coordinate j of the field n of the supermacroblock. It is assumed that the field n-1 is the top field of the picture and n the bottom field of the picture of the supermacroblock.

Step 8 carries out the inter calculation of FLADinterMB corresponding to the difference in absolute value between the macroblock of the field n and that of the field n-1.

$$FLABInterMB = \sum_{j=0}^{15}\sum_{i=0}^{15} |FY_n(i, j) - FY_{n-1}(i, j)|$$

For each supermacroblock constituted by the lines of the macroblock of the field n and the lines of the macroblock corresponding to the field n-1, the vertical gradient of the block 16×32, when it is in a frame configuration, is compared to the vertical gradient of the 16×32 block when it is in a field configuration. Step 9 thus calculates the ratio R called the relative activity index:

$$R = \frac{FLADInterMB}{1 + FLADIntraMB_n + FLADIntraMB_{n-1}}$$

In another way, the R ratio represents, at the numerator, the gradient of 16×16 field macroblocks between two successive fields n-1 and n and, at the denominator, the sum at 1 of the gradients of 16×16 field macroblocks between successive lines taken two by two, of the field n and the field n-1.

The following step 10 compares this calculated value R at a predefined threshold T1, that can be determined empirically.

If the R ratio is greater than the T1 threshold, the supermacroblock is considered as belonging to a region in motion or in activity and is called supermacroblock with activity.

If R is greater than the threshold T1, a step 11 increments a counter NbMBfield enabling the number of macroblocks of the picture meeting this condition to be known.

If R is less than the threshold T1, the next step is step 12 that verifies whether this involves the last supermacroblock of the picture.

If it does not involve the last supermacroblock, step 12 is looped back to step 7 by means of a step 13 that replaces the current supermacroblock with the next supermacroblock according to the direction of scanning. If it involves the last supermacroblock, that is when the picture has been entirely processed, the next step 14 compares the value NbMBfield to the number of macroblocks in the picture divided by two. If this value is greater than this number, that is if the ratio of supermacroblocks in motion to supermacroblocks of the picture exceeds 50%, the picture is coded in field mode, step 15. If this value is less than or equal, the picture is coded in frame mode, using the MBAFF mode, step 16.

The algorithm implemented is based on an a priori criterion. If, during the pre-analysis, the number of macroblocks declared in motion, or having spatial and temporal activity, is greater than a threshold, in the example half the number of macroblocks in the picture, it is advantageous to force the coding of all the macroblocks of the picture in field mode, that is to code the picture in field mode. In the contrary case, the picture is coded in frame mode, leaving the choice, for coding at the supermacroblock level, to the field or frame mode.

The method according to the invention was compared to those previously mentioned, namely the method using a gradient algorithm and the method using the coding algorithm of the P pictures of predictive type into field mode and the B pictures of bidirectional type into frame mode, on several typical sequences known for their usefulness as test sequences to determine the coding quality.

The results are provided in the table below in comparison with an a posteriori algorithm, which is the reference algorithm giving the best results.

The figures shown represent the loss percentages in terms of bitrate/distortion of an algorithm with respect to the "best" algorithm marked with a cross. It concerns the ratio of the areas under the curve distortion=f(bitrate). This manner of comparing video coding algorithms corresponds to the one currently used in the video compression community, better known under the measurement name "Bjontegaard" and described in the document by Gisle Bjontegaard "Calculation of average PSNR differences between RD curves", document VCEG-M33, ITU-T Video Coding Experts Group (VCEG) Meeting, April 2001.

|  | A posteriori algorithm | Algorithm P in field, B in frame | Gradient Algorithm | Proposed algorithm |
| --- | --- | --- | --- | --- |
| auto+ | x | −24.88 | −22.93 | −19.83 |
| ski+ | x | −17.17 | −21.24 | −21.04 |
| tennis+ | x | −16.46 | −15.77 | −15.77 |
| bigdil+ | x | −13.46 | −14.43 | −18.73 |
| guards-parade_720_576 | x | −20.55 | −19.17 | −19.17 |
| speed-skate1_720_576 | x | −23.49 | −26.32 | −21.47 |
| speed-skate2_720_576 | x | −19.04 | −25.82 | −19.4 |
| mobcal_720 × 480 | x | −19.09 | −14.81 | −14.81 |
| flower+ | x | −18.86 | −14.58 | −14.58 |
| ferris+ | x | −18.07 | −17.19 | −15.99 |

With the exception of a single sequence (bigdil), the algorithm according to the invention produces better or at least equivalent results to that of the gradient.

The invention also relates to a device to implement the method. It comprises a pre-analysis circuit and an actual coder. The pre-analysis circuit uses the field-frame decision algorithm previously described. Information relating to the field-frame coding mode is sent to the coder for the effective realisation of the coding of the sequence of pictures.

The examples are provided for macroblocks of size 16×16. Naturally, the invention applies to macroblocks of any size.

The invention applies to any type of standard using the MBAFF mode, particularly le MPEG4 standard or H 264.

The invention claimed is:

1. A method for coding pictures in field or frame mode, the picture frame mode being able to use the field mode locally in the picture, for a group of macroblocks, the method comprising:
    calculating, for a group of macroblocks in field mode, spatial activities of each constituent macroblock and a temporal activity between the macroblocks of each constituent field,
    calculating an activity index relating to the group that is an increasing function of the temporal activity and a decreasing function of the calculated spatial activities,
    comparing the activity index relating to the group, to a predefined threshold, to define it as a group having activity,
    coding the picture in field or frame mode according to a number of macroblock groups detected having activity with respect to a number of groups of macroblocks in the picture, wherein said group is a supermacroblock and wherein the activity index equals to $$R = \frac{FLADInterMB}{1 + FLADIntraMB_n + FLADIntraMB_{n-1}}$$

with $$FLABInterMB = \sum_{j=0}^{15}\sum_{i=0}^{15} |FY_n(i, j) - FY_{n-1}(i, j)|,$$

$$FLADIntraMB_n = \sum_{j=0}^{7}\sum_{i=0}^{15} |FY_n(i, 2j) - FY_n(i, 2j+1)|,$$

being an inter-field luminance gradient;
being an intra-field luminance gradient in field n; and
    $FY_n(i,j)$ representing the luminance value of the pixel of horizontal coordinate i and vertical coordinate j of the field n of the supermacroblock.

2. The method according to claim 1, wherein the field or frame mode at the level of the group of macroblocks is the MBAFF (MacroBlock Adaptive Field Frame) mode.

3. The method according to claim 1, wherein if the ratio of the number of supermacroblock declared with activity to the total number of supermacroblock is greater than a predetermined threshold, the picture is coded in field mode, the picture being coded in MBAFF frame mode otherwise.

4. The method according to claim 3, wherein the predetermined threshold is a ratio of 1/2.

5. A device comprising a pre-analysis circuit to perform a coding decision algorithm, linked to a coding circuit for the actual coding of a picture in field or frame mode, wherein the coding circuit receives from the pre-analysis circuit coding information in field or frame mode according to the number of groups of macroblocks detected having activity, in the picture, wherein the device is configured to:
- calculate, for a group of macroblocks in field mode, spatial activities of each constituent macroblock and a temporal activity between the macroblocks of each constituent field,
- calculate an activity index relating to the group that is an increasing function of the temporal activity and a decreasing function of the calculated spatial activities,
- compare the activity index relating to the group, to a predefined threshold, to define it as a group having activity, and
- code the picture in field or frame mode according to a number of macroblock groups detected having activity with respect to a number of groups of macroblocks in the picture, wherein said group is a supermacroblock and wherein the activity index equals to $$R = \frac{FLADInterMB}{1 + FLADIntraMB_n + FLADIntraMB_{n-1}} \text{ with } FLADInterMB = \sum_{j=0}^{15} \sum_{i=0}^{15} |FY_n(i, j) - FY_{n-1}(i, j)|,$$

being an inter-field luminance gradient;

$$FLADIntraMB_n = \sum_{j=0}^{7} \sum_{i=0}^{15} |FY_n(i, 2j) - FY_n(i, 2j+1)|,$$

being an intra-field luminance gradient in feild n; and $FY_n(i,j)$ representing the luminance value of the pixel of horizontal coordinate i and vertical coordinate j of the field n of the supemacroblock.

* * * * *